United States Patent [19]
Millard

[11] Patent Number: 5,682,832
[45] Date of Patent: Nov. 4, 1997

[54] SNOWMOBILE QUICK-DEPLOYMENT FLOATS

[76] Inventor: Wayne C. Millard, 5 Maple Gate Court, Etobicoke, Ontario, Canada, M9C 2K4

[21] Appl. No.: 643,337

[22] Filed: May 6, 1996

[51] Int. Cl.$^6$ .................................................. B63B 43/14
[52] U.S. Cl. ............................................ 114/123; 114/270
[58] Field of Search ........................... 114/61, 123, 344, 114/343, 270

Primary Examiner—Stephen Avila
Attorney, Agent, or Firm—Eugene J.A. Gierczak

[57] ABSTRACT

A flotation device for snowmobiles that can be quickly deployed in the event of breaking through the ice when travelling on a frozen lake, river or other body of water, and, in addition, if desired, such device may be deflated or inflated independent of power sources beyond those supplied by the subject snowmobile itself.

5 Claims, 3 Drawing Sheets

FLOAT DEFLATED POSITION

FRONT FLOAT (DEFLATED) ONE ON TOP OF EACH SKI

AFT FLOAT (DEFLATED) ONE UNDER EACH FOOT STEP

FIGURE 1 : - FLOAT DEFLATED POSITION
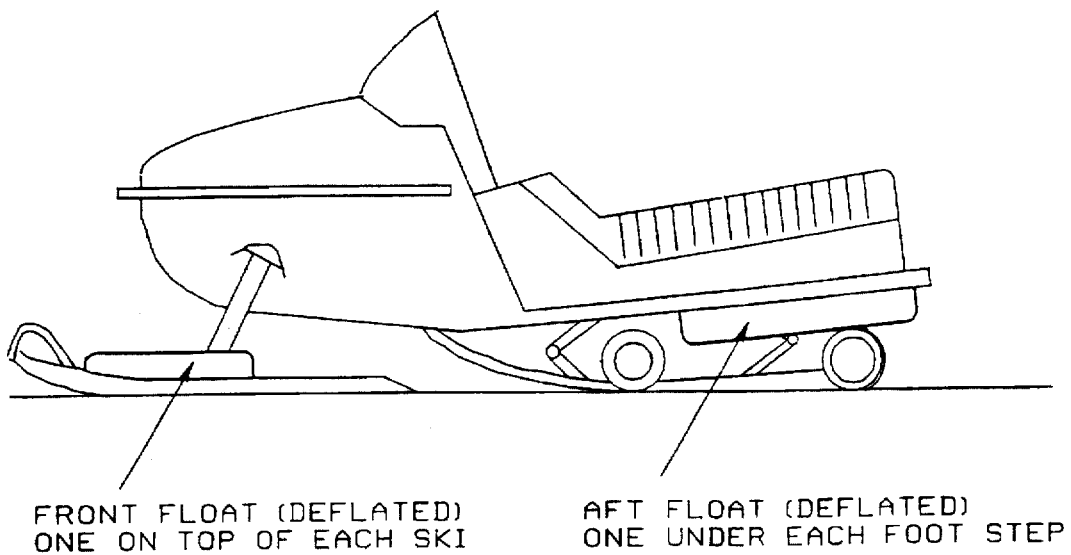
FRONT FLOAT (DEFLATED)　　AFT FLOAT (DEFLATED)
ONE ON TOP OF EACH SKI　　ONE UNDER EACH FOOT STEP

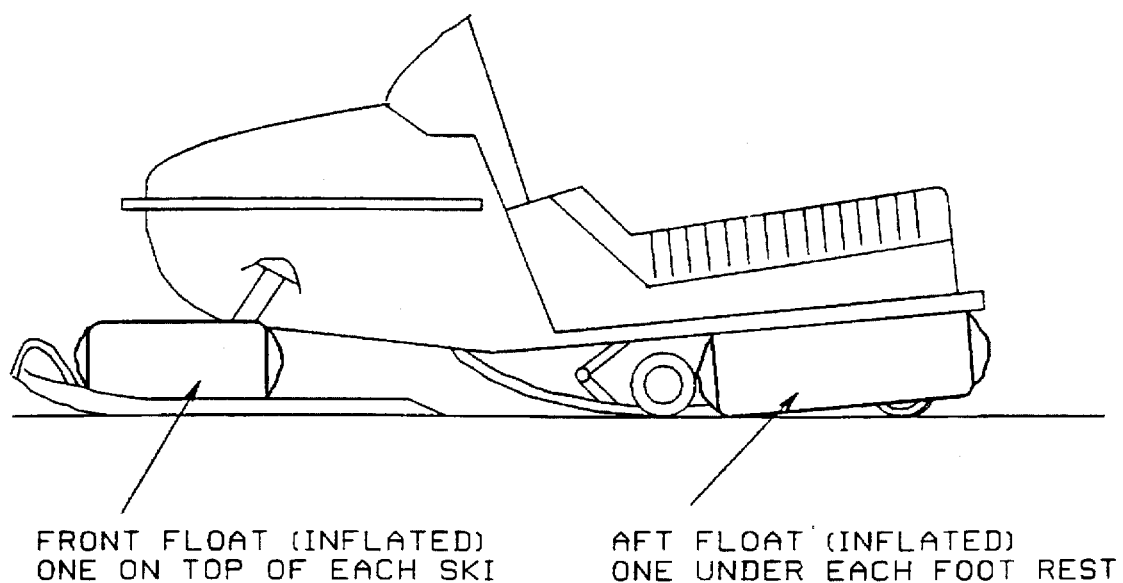
FIGURE 2 : - FLOAT INFLATED POSITION
FRONT FLOAT (INFLATED)
ONE ON TOP OF EACH SKI
AFT FLOAT (INFLATED)
ONE UNDER EACH FOOT REST FIGURE 3 : - SYSTEM SCHEMATIC
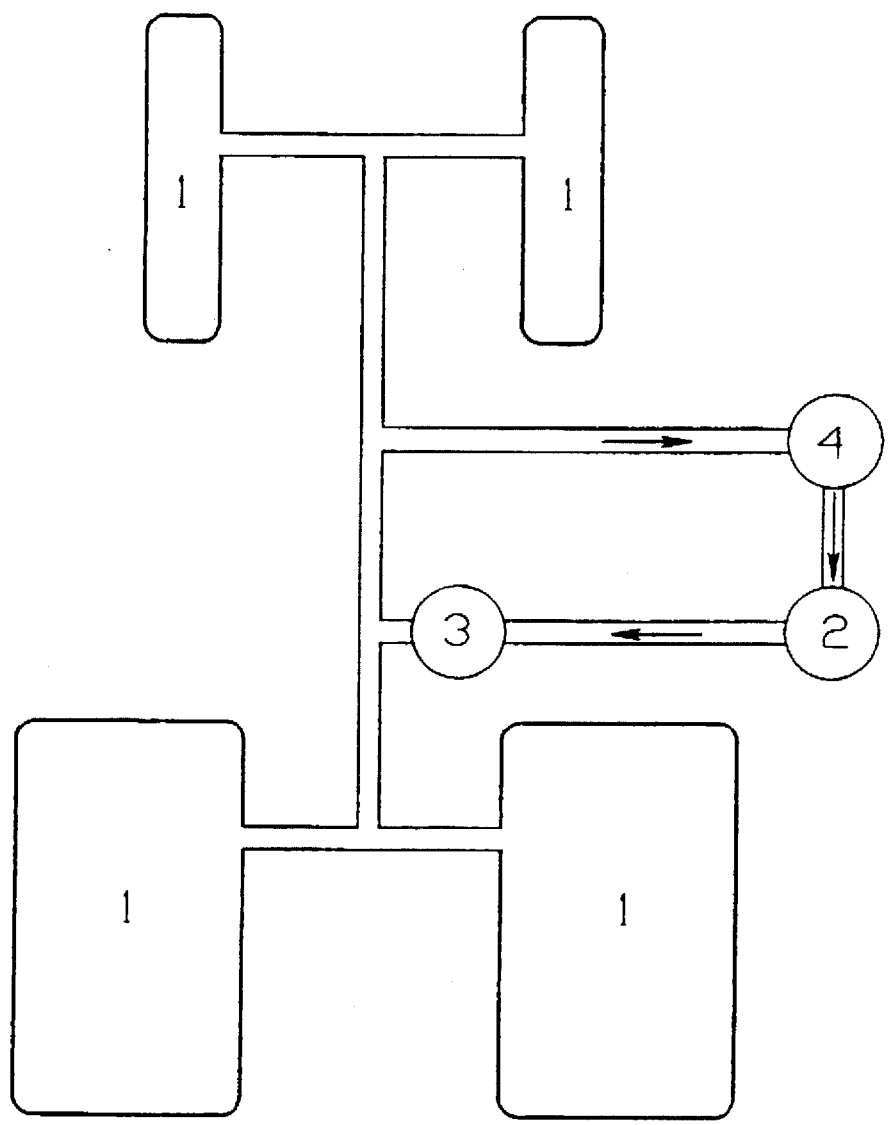

SNOWMOBILE QUICK-DEPLOYMENT FLOATS

BACKGROUND

Accidental drownings occur each year due to snowmobiles inadvertently breaking through the ice covered surfaces of a lake or river or other body of water.

In addition, during season changes, i.e. freeze-up and break-up, crossing a body of water by surface travel presents extra difficulty due to the water surface being neither well suited for snowmobiles nor well suited for boats.

My invention eases these difficulties by means of a quick-deployment flotation device.

SUMMARY

My invention relates to a popout type of emergency or safety flotation device for snowmobiles, but that also may be used in a deliberate fashion for crossing open or marginally open water.

The device is designed to be in the deflated position during normal travel, so as not to be cumbersome or easily damaged when travelling on a trail, and when deployed, will very quickly pop out to the inflated position. However, as well, should open water be encountered and the operator wish to cross it, as for example, could occur to a rescue team attempting to reach a spot beyond a half-frozen river, the floats can be inflated for the crossing, and then deflated to the "ready" position again for resumption of trail travel.

DRAWINGS

FIG. 1 is a sketch of the floats in the deflated position.
FIG. 2 is a sketch of the floats in the inflated position.
FIG. 3 is a system schematic.

DESCRIPTION

The floats 1 are made of a flexible material that takes a defined shape upon inflation. There are four floats 1, one on top of each ski and one on the bottom of each aft footboard.

The ski floats 1 expand, longitudinally aligned with their ski, and positioned so as to be longer to the front of the steering pivot point, enabling steering action in the water.

The aft floats 1 expand both down and outward, so as to provide lateral stability in the water. The desirable amount of flotation will result in the track being partially submerged, thus giving traction in the water.

All four floats 1 are connected by pipe to a gas-charged bottle 2. Activation of a valve 3 releases the compressed gas, such as air, to the floats 1.

The valve may be activated by many means, such as electrical switch, mechanical action, or pressure switch that operates when water submerged.

An air pump 4, that may be operated electrically, or mechanically by engine-driven belt, or other independent means, is used to recharge the bottle 2, and also to efficiently evacuate the floats 1 during deflation.

I claim:

1. In a snowmobile having a body, steerable skis and a motive power means, the improvement comprising a flotation system comprising (a) a plurality of inflatable floats;
   (b) and in which one said float is attached to the top of each steering ski so as to permit steering of said ski when said float is inflated;
   (c) and in which the aforesaid ski-mounted floats are of oblong shape to assist in steerability in the water;
   (d) and in which one said float is attached to each side of the rear body of the snowmobile;
   (e) and in which all floats are connected by pipe to a single compressed air bottle;
   wherein the floats attached to the rear body provide flotation support allowing the snowmobile track's lower portion to be immersed in water but not allowing the track's upper portion to be immersed in water.

2. The invention of claim 1, in which a valve is located in the outlet pipe of the compressed air bottle, so, that when closed it will pneumatically seperate the compressed air bottle from the said floats, and that when open it will pneumatically connect the compressed air bottle and the floats.

3. The invention of claim 1, in which a pump is located in the compressed air bottle's return pipe, that returns air from the floats to the compressed air bottle.

4. The invention of claim 3, in which the pump is powered by either the battery of the subject snowmobile, or by a drive off the engine of the subject snowmobile.

5. The invention of claim 1 in which one of said floats is attached to the top of each steering ski so as to permit the steering of said ski when said float is inflated.

* * * * *